UNITED STATES PATENT OFFICE.

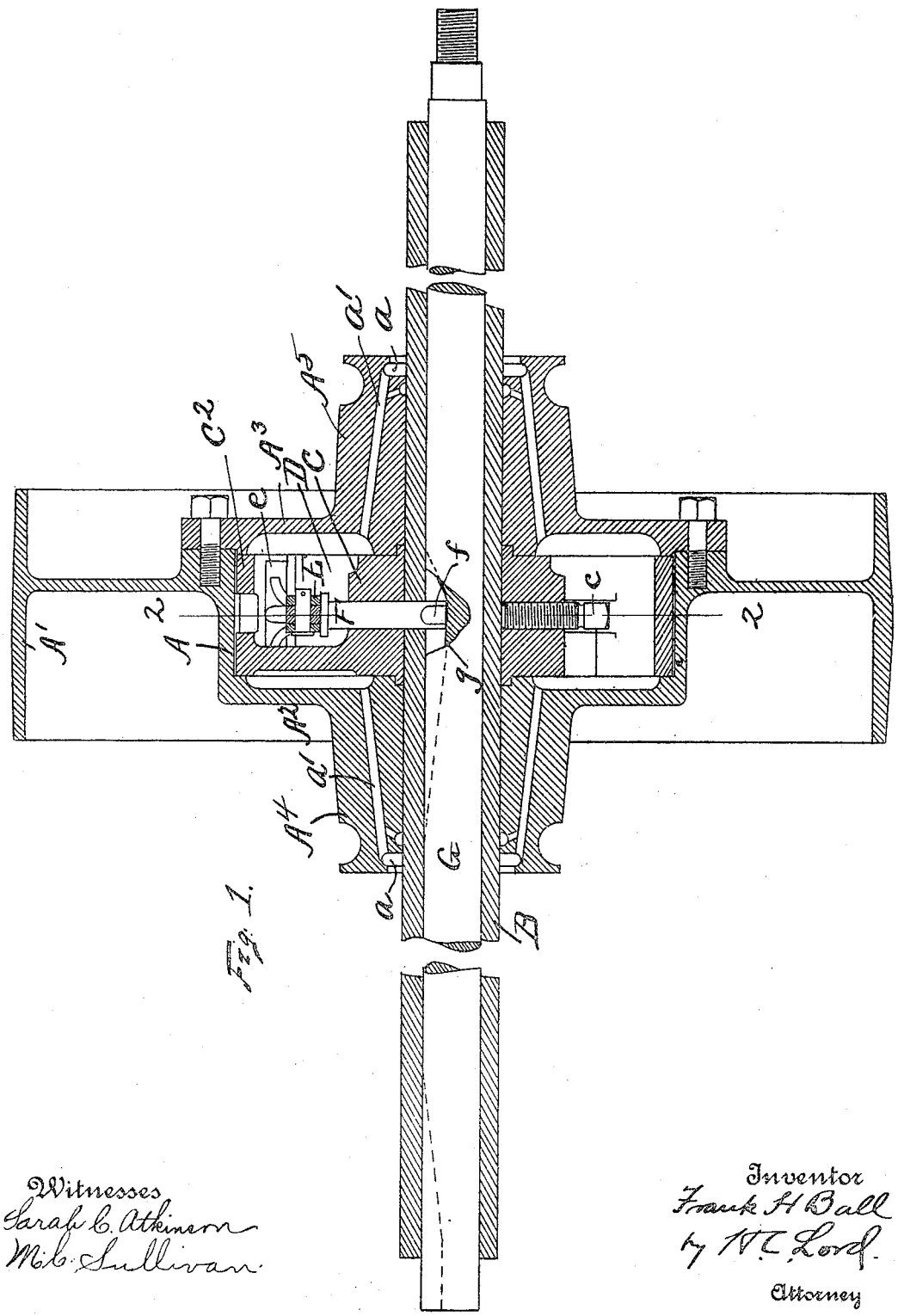

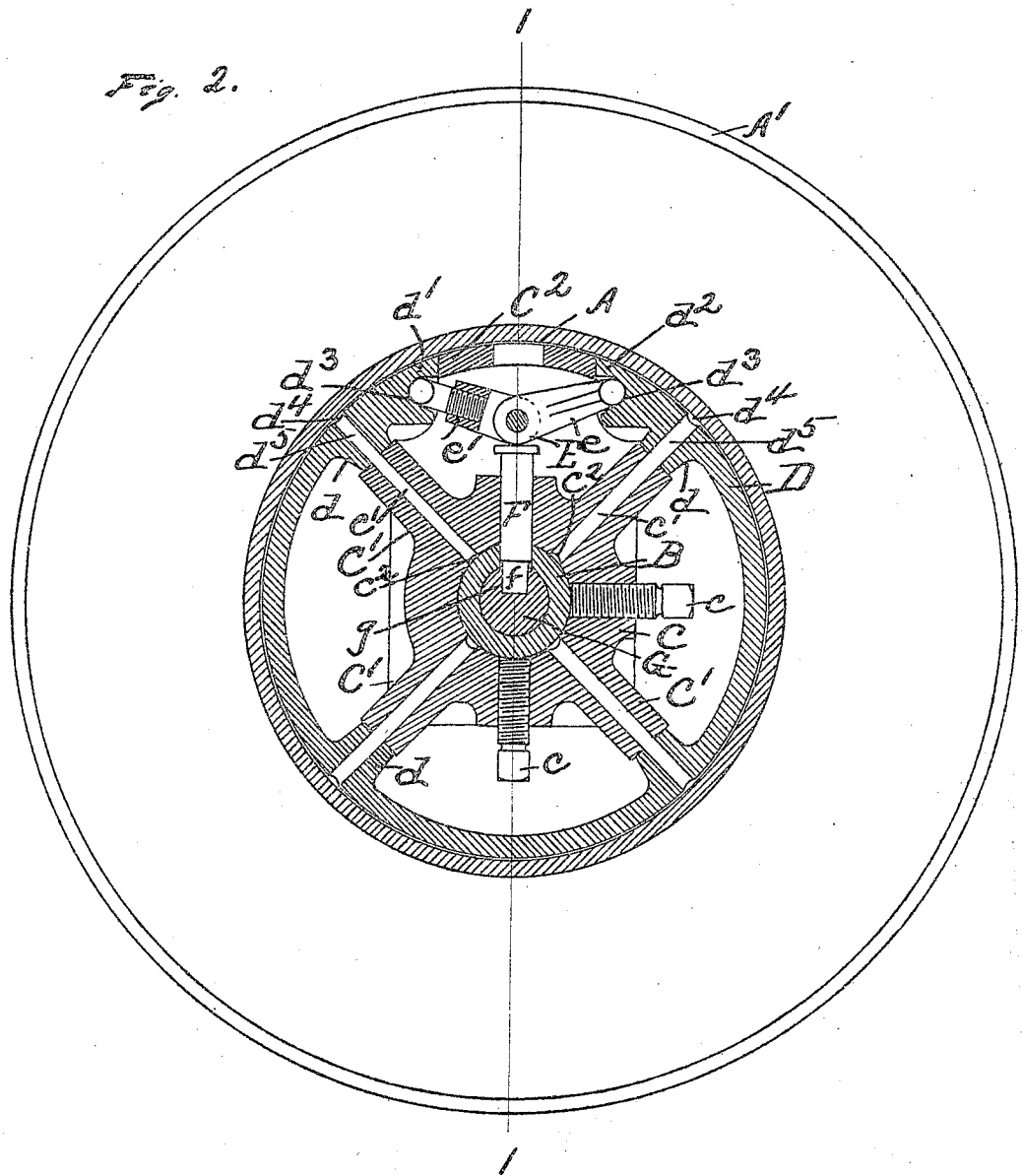

FRANK H. BALL, OF PLAINFIELD, NEW JERSEY.

FRICTION-CLUTCH.

No. 808,622.  Specification of Letters Patent.  Patented Jan. 2, 1906.

Application filed June 29, 1903. Serial No. 163,608.

*To all whom it may concern:*

Be it known that I, FRANK H. BALL, a citizen of the United States, residing at Plainfield, in the county of Union and State of New Jersey, have invented new and useful Improvements in Friction-Clutches, of which the following is a specification.

This invention relates to friction-clutches; and it consists in certain improvements in the construction thereof, as will be hereinafter fully described, and pointed out in the claims.

The object of the invention is to provide a friction-clutch which is equally efficient with the mechanism running in either direction, one occupying a very small space, so that it may be entirely inclosed and also to afford a means for lubricating the parts, so as to prevent wear, as well as other details of construction, as will more fully appear from the drawings and specification.

The invention is illustrated in the accompanying drawings as follows:

Figure 1 shows a section on the line 1 1 in Fig. 2. Fig. 2 shows a section on the line 2 2 in Fig. 1.

A marks an annular friction-surface; A' a pulley carried by or carrying said friction-surface. This pulley is provided with the web A² and hub A⁴, the web A², with the annular friction-surface A, forming a cavity for the reception of the friction mechanism. This cavity is closed by a flange A³, which is secured to the pulley, and this flange has the hub A⁵, so that the pulley, which in ordinary practice is a loose pulley, has a hub at each side of the friction device, thereby giving it a wide bearing. In the construction shown the pulley is the driving member. It will of course be understood that as far as many features of the invention are concerned it may be a driven member. The pulley is journaled on the hollow shaft B, and the friction-ring carrier C is fixed on this shaft within the cavity in the pulley. The set-screw $c$ secures the carrier on the shaft. This carrier is provided with the arms C'. The friction-ring, which is of the split-ring type, is sprung onto these arms, the lugs $d$ being arranged on the ring to fit on the arms C' and are so proportioned that when the ring is in place on said arms the ring does not normally engage the friction-surface A. A projection C² extends from the carrier between the ends of the friction-ring D and forms an abutment against which the driving end of the ring is pressed when the clutch is in action. A toggle-joint E, having the arm $e$ and adjustable arm $e'$, is arranged between the ends of the split ring, the ends of the ring being provided with the sockets $d^3$ for this purpose. The pin F extends through the carrier and hollow shaft B. The toggle-joint rests on the hub of this pin. The lower end of this pin has a step $f$, which operates in a groove $g$ in an operating-rod G. This operating-rod is placed within the hollow shaft B, and the groove $g$ has the inclined bottom, as clearly indicated in Fig. 1, so that as the rod is moved axially the inclined bottom of the groove forces the pin F outwardly, and this operating upon the toggle-joint E spreads the ring D and sets the clutch. If the loose pulley is running toward the left, as shown in Fig. 2, the end $d^2$ of the ring D becomes the driving or fixed end and the end $d'$ the free end, so that the toggle-joint when operated upon moves the free end. On the other hand, if the pulley is running toward the right, as shown in Fig. 2, the end $d'$ becomes the driving end and the end $d^2$ the free end. It will be noted, therefore, that the split ring D has a limited movement, that the toggle is free to move with it, being in no way attached to the pin F, and either end of the split ring may become the driving end, in which event the opposite end becomes the free end or the end actuated to set the clutch.

I have provided the following lubricating device: The split ring D has the grooves $d^4$ extending across its face. These grooves communicate with the passages $d^5$. The passages $d^5$ register with the passage $c'$, extending through the arms of the carrier C, and communicate with grooves $c^2$ in the carrier. At the outer ends of the hubs A⁵ are annular grooves $a$, which lead to the passage $a'$. These passages extend outwardly from said groove $a$ into the clutch-chamber. The operation of this member of the oiling device is as follows: When the carrier is stationary, the oil in the clutch-cavity, owing to centrifugal force due to the rotation of the pulley A', is carried out against the friction-surface A, lodges in the groove $d^4$, and passes by gravity through the uppermost passages $d^5$ and $c'$ to the shaft B. It feeds along the shaft B by means of the groove $c^2$ and lubricates the journal formed by the hub of the pulley on the shaft B. As the oil reaches the outer ends of the hub it passes into the groove $a$ and from this by centrifugal force into and through the passage $a'$, when the operation just hereinbefore stated is repeated. Thus there is a constant circulation of oil. Of course as soon as the clutch is set the oil ceases to run by gravity to the shaft; but as the pulley is then fixed on the shaft no lubrication of the journal is necessary. As soon as the clutch is thrown out and the carrier becomes stationary the circulation of oil starts and continues until the clutch is again set.

What I claim as new is—

1. In a friction-clutch the combination of an annular friction-surface a split friction-ring adapted to act on said surface; a carrier for said split ring, the ends of said ring having a limited circumferential movement on said carrier; and mechanism for actuating the free end of the ring to set the clutch, each end of the ring being adapted to become either the driving or free end according to the direction of movement of the clutch the ring being driven with a clutch moving in one direction from its end.

2. In a friction-clutch, the combination of an annular friction-surface, a split ring adapted to act on said surface, a carrier for said split ring the ends of said ring having a limited circumferential movement on said carrier, and mechanism for actuating the free end of the ring to set the clutch, each end of the ring being adapted to become either the driven or free end according to the direction of movement of the clutch, the ring being driven with the clutch moving in either direction from its end.

3. In a friction-clutch the combination of an annular friction-surface; a split friction-ring adapted to act on said surface; a carrier for said split-ring, the ends of said ring having a limited movement on said carrier said ring being driven from its end; and a toggle-joint between the ends of the ring and arranged to actuate the free end thereof.

4. In a friction-clutch the combination of an annular friction-surface a split friction-ring adapted to act on said surface; a carrier for said split ring, the ends of said ring having a limited movement on said carrier said ring being driven from its end; a toggle-joint free to move with the ring arranged between the ends of the ring and adapted to actuate the free end thereof.

5. In a clutch the combination of a friction-surface; a split ring adapted to operate against said surface; a carrier for said split ring, said split ring being adapted to spring on the said carrier and to be normally free from the annular friction-surface, and said carrier having a projection extending between the ends of the split ring and adapted to form an abutment against either end of the split ring as said end may be the driving end of the ring; and means for actuating the free end of the ring.

6. In a clutch the combination of a friction-surface; a split ring adapted to operate against said surface; a carrier for said split ring, said split ring being adapted to spring on the said carrier and to be normally free from the annular friction-surface, and said carrier having a projection extending between the ends of the split ring and adapted to form an abutment against either end of the split ring as said end may be the driving end of the ring; means for actuating the free end of the ring; the hollow shaft B; the rod G having the cam-surface thereon in said shaft; the pin F extending from said cam-surface against the means for actuating the free end of the split ring.

7. In a friction-clutch the combination of a friction-surface A; the split ring D arranged to engage said surface; the carrier C on which said split ring is sprung, said carrier having the projection $C^2$ extending between the ends of the split ring; the toggle-joint E also extending between the ends of said split ring, said split ring with the toggle-joint having a limited movement on the carrier; the hollow shaft B on which said carrier is mounted; the rod G arranged in said hollow shaft and having a cam-surface thereon; and the pin F extending from said cam-surface against the toggle E.

8. In a friction-clutch, the combination with the driving member thereof having within itself a completely-inclosed oil-retaining clutch-cavity; a clutch mechanism arranged in said cavity; a hollow shaft on which said mechanism is mounted; and means within said shaft for operating said clutch.

9. In a friction-clutch, the combination of an annular friction-surface; a hub thereon forming with the friction-surface a clutch-cavity; a clutch device within said cavity, said clutch device being provided with passages extending from the outer part of the clutch toward the axis, the hub for the annular friction-surface being provided with passages leading from the inner part of the hub to the clutch-cavity.

10. In a friction-clutch the combination with an annular friction-ring having hubs for the same forming with the annular surface a clutch-cavity, said hubs being provided with passages leading from the inner part of the hub to the clutch-cavity; a clutch mechanism comprising a split ring; and a carrier therefor, said split ring and carrier being provided with passages in register leading from the ring through the carrier toward the axis of the clutch.

11. In a friction-clutch, the combination with the clutch members having friction-surfaces adapted to be brought into engagement; a shaft on which said members are mounted, one of said members being fixed on said shaft and the other journaled thereon, the member journaled on the shaft having passages leading from the shaft to the clutch-surfaces, and the member fixed on the shaft having passages leading from the clutch-surfaces to the shaft.

12. In a friction-clutch the combination with the friction-surface A; the hubs secured thereon, and forming with the friction-surface a clutch-cavity; the split ring D; the carrier C on which said split ring is sprung, said carrier having the projection C² between the ends of the carrier; means for actuating said split ring, said split ring and carrier being provided with the passages $d^5$ and $c'$ through which oil passes by gravity; the rod B on which said carrier is fixed one of said hubs being provided with the grooves $a$ and passages $a'$ leading from the grooves $a$ to the clutch-cavity whereby oil may be carried from the journal to the clutch-cavity by centrifugal force.

13. In a friction-clutch, the combination with the clutch members, one of which is loose relatively to the other when the clutch is released, said clutch mechanism comprising friction-surfaces adapted to be brought into engagement; an oiling device arranged to carry oil from the friction-surfaces toward the axis of the clutch mechanism by gravity, and to return it to the surfaces at the outer part of the clutch by centrifugal force after its passage through the bearing of the loose member whereby a circulation of oil through the loose member is accomplished.

In testimony whereof I have hereunto set my hand in the presence of two subscribing witnesses.

F. H. BALL.

Witnesses:
 E. S. BOYER,
 HENRIETTA MAHLAR.